United States Patent
Pappas et al.

(10) Patent No.: US 11,330,104 B1
(45) Date of Patent: May 10, 2022

(54) SELECTIVELY ROUTING EMERGENCY CALLS BETWEEN A PUBLIC SAFETY ANSWERING POINT (PSAP) AND IN-FIELD FIRST RESPONDERS

(71) Applicant: MOTOROLA SOLUTIONS, INC., Chicago, IL (US)

(72) Inventors: Scott J. Pappas, Lake Zurich, IL (US); Francois Cregheur, Gatineau (CA); Chantal Levert, Ottawa (CA); Steve Mardakis, Gatineau (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/181,930

(22) Filed: Feb. 22, 2021

(51) Int. Cl.
*H04M 3/51* (2006.01)

(52) U.S. Cl.
CPC .................. *H04M 3/5116* (2013.01)

(58) Field of Classification Search
USPC ................ 379/38, 33, 37; 455/404.01
See application file for complete search history.

(56) References Cited

U.S. PATENT DOCUMENTS

| 2010/0166154 A1 | 7/2010 | Peters | |
| 2011/0117878 A1* | 5/2011 | Barash | G08B 25/005 455/404.2 |
| 2016/0100302 A1 | 4/2016 | Barash et al. | |
| 2018/0352084 A1 | 12/2018 | Czachor, Jr. et al. | |
| 2020/0314623 A1* | 10/2020 | Pellegrini | H04W 76/15 |

FOREIGN PATENT DOCUMENTS

WO 2020085924 A1 4/2020

* cited by examiner

*Primary Examiner* — Maria El-Zoobi
(74) *Attorney, Agent, or Firm* — Michael Best & Friedrich LLP (57) ABSTRACT

Systems and methods for selectively routing emergency calls between public safety answering points and in-field first responders. One example method includes determining one or both of an identity and a location of an emergency caller. The method includes retrieving, based on the identity and/or the location, active incident information identifying one or more active incidents associated with the identity and/or the location. The method includes identifying identities and/or locations of one or more in-field first responders associated with the one or more active incidents and comparing the identity and/or location of the emergency caller to the identities and/or locations of the in-field first responders associated with the active incidents. When a match is found based on the comparison, the emergency call is routed to one of the matching in-field first responders and not to the PSAP. When a match is not found, the emergency call is routed to the PSAP.

25 Claims, 6 Drawing Sheets

SELECTIVELY ROUTING EMERGENCY CALLS BETWEEN A PUBLIC SAFETY ANSWERING POINT (PSAP) AND IN-FIELD FIRST RESPONDERS

BACKGROUND OF THE INVENTION

Members of the public, encountering public safety incidents such as traffic accidents, structure fires, crimes or other law enforcement events, natural disasters, and the like, may seek emergency assistance by calling 9-1-1 using wireless communications devices. Calls to 9-1-1 are routed to public safety answering points (PSAPs), where they are answered by call takers. PSAP call takers engage emergency callers to gather information and dispatch public safety personnel and resources to respond to the public safety incidents. The public safety personnel (for example, firefighters, police officers, paramedics, and the like) on duty near or responding to public safety incidents are equipped with portable communications devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted, emergency callers requesting assistance related to a public safety incident may make emergency calls using a 911 system. In current 911 systems, emergency calls are terminated at a public safety answering point (PSAP). Call takers at the PSAP answer and process the calls. For example, a call taker may ascertain the identity and location of the emergency caller, gather information from the caller about the incident, and dispatch appropriate services to respond to the incident. Call takers may also prioritize emergency calls and responses based on the nature of the incidents and information received from the callers. Call takers relay information received from emergency callers to in-field first responders (for example, firefighters, police officers, and paramedics), who may use the information to respond to the incident.

Public safety incident response is most effective when communications relating to the response is received quickly and by the relevant personnel responding to an incident. For example, information regarding the identity of a criminal suspect (provided by a caller who witnessed the crime) should be promptly provided to one of the police officers investigating the crime. However, PSAPs may be overloaded with emergency calls, resulting in information being delayed or not received at all. Additionally, transcribing, prioritizing, and relaying of information by call takers can be inefficient and may introduce errors into the information. The increased prevalence of community policing initiatives, which generate more information, and thus more load on the PSAP and call takers, exacerbates these problems. Furthermore, community policing and other software applications ("apps") allow the public to submit information that is not integrated into the 911 workflow, which results in a more disjointed information flow and presents difficulties and more opportunity for introducing errors as information from disparate sources must be integrated.

In-field first responders waiting on delayed information may contact the call takers requesting further information, resulting in wasted use of network resources and further delays in the processing of emergency calls as call takers handle the requests. Errors introduced into the information may result in too many, too few, or the wrong resources being dispatched, or may otherwise hinder the first responders' response to the public safety incident. As noted, the in-field first responders that are on duty near or responding to public safety incidents are equipped with portable communications devices (for example, smart telephones and two-way radios) capable of receiving emergency calls.

To address, among other things, these problems, systems and methods are provided herein for selectively routing emergency calls to a public safety answering points or the portable communications devices of the in-field first responders. Embodiments described herein provide, among other things, a call routing computing device. The call routing computing device is disposed between the traditional 911 call routing systems, the public safety answering point, and the portable communications devices of the in-field first responders. The call routing computing device determines, based on contextual information relating to the emergency caller, public safety incidents, and in-field first responders, whether to bypass the PSAP and route an emergency call directly to the portable communications device of an appropriate in-field first responder.

Among other things, using such embodiments, emergency callers may bypass the PSAP and be connected directly to a relevant in-field first responder. Emergency calls may bypass the PSAP based on, among other things, a status or capacity of the PSAP, the subject matter of the emergency call, or an ongoing public safety incident status. For example, when the PSAP is overloaded with call volume, emergency calls may be routed to public safety personnel already deployed near the emergency caller's location. In another example, an emergency caller may have information relating to an active field investigation and be connected directly to personnel performing the investigation. In another example, an emergency caller may be directly connected to in-field first responders because that caller has already been in contact with the in-field first responders about an ongoing public safety incident.

Using such embodiments, emergency calls that bypass the PSAP may be automatically associated (for example, using information submitted by the emergency caller) with an existing incident record (for example, in a computer aided dispatch system) or with a new incident record created for the call. Emergency calls rerouted to in-field first responders, though bypassing the PSAP, are still visible to call takers and other PSAP personnel. Call takers are still able to join the emergency call, redirect the call back to the PSAP, communicate with the in-field first responder directly (that is, outside of the emergency call), associate the call with an incident (or modify an automated association), and review an ongoing transcription of the emergency call.

Embodiments described herein, by automatically routing relevant calls to in-field first responders, improve the overall response to public safety incidents. This improvement, in turn, leads to more reliable collection and distribution of emergency response information, more efficient use of computer aided dispatch systems, more efficient use of public safety communications networks and their respective computing resources, and the reservation of resources for response to public safety incidents, among other benefits.

One example embodiment provides a method for routing an emergency call between a public safety answering point and in-field first responders. The method includes determining, at a call routing computing device, one or both of an identity of an emergency caller and a location of the emergency caller. The method includes retrieving, by the call routing computing device, based on the one or both of the identity and the location of the emergency caller, active incident information from one or more incident records databases associated with the PSAP, the active incident information identifying one or more active incidents associated with the one or both of the identity and the location of the emergency caller. The method includes identifying, by the call routing computing device, one or both of identities and locations of one or more in-field first responders associated with the one or more active incidents. The method includes comparing the one or both of the identity and the location of the emergency caller to the one or both of the identities and the locations of the one or more in-field first responders associated with the one or more active incidents. The method includes, when a match is found based on the comparison, routing, by the call routing computing device, the emergency call to one of the matching in-field first responders and not to the PSAP or to a call-taking terminal at the PSAP. The method includes, when a match is not found based on the comparison, routing, by the call routing computing device, the emergency call to the PSAP or to the call-taking terminal at the PSAP and not to any of the one or more in-field first responders.

Another example embodiment provides a call routing computing device communicatively coupled between an emergency caller communications device initiating an emergency call and a call-taking terminal at a public safety answering point. The device includes a communication interface and an electronic processor communicatively coupled to the communication interface. The electronic processor is configured to receive, via the communication interface, the emergency call. The electronic processor is configured to, prior to connecting the emergency call to the call-taking terminal at the PSAP, determine one or both of an identity of an emergency caller associated with the emergency caller communications device and a location of the emergency caller. The electronic processor is configured to retrieve, via the communication interface and based on the one or both of the identity and the location of the emergency caller, active incident information from one or more incident records databases associated with the PSAP, the active incident information identifying one or more active incidents associated with the one or both of the identity and the location of the emergency caller. The electronic processor is configured to identify one or both of identities and locations of one or more in-field first responders associated with the one or more active incidents. The electronic processor is configured to compare the one or both of the identity and the location of the emergency caller to the one or both of the identities and the locations of the one or more in-field first responders associated with the one or more active incidents. The electronic processor is configured to, when a match is found based on the comparison, route, via the communication interface, the emergency call to one of the matching in-field first responders and not to the PSAP or to the call-taking terminal at the PSAP. The electronic processor is configured to, when a match is not found based on the comparison, route, via the communication interface, the emergency call to the PSAP or to the call-taking terminal at the PSAP and not to any of the one or more in-field first responders.

Another example embodiment provides a system for routing an emergency call between a public safety answering point and in-field first responders. The system includes a display, a transceiver, and an electronic processor communicatively coupled to the display and the transceiver. The electronic processor is configured to generate a graphical user interface including a primary window and a secondary window. The primary window includes a map, and a plurality of auto-routed emergency caller indicators overlaid on the map, wherein each of the plurality of auto-routed emergency caller indicators is associated with one of a plurality of active auto-routed emergency calls. The secondary window includes a collapsible list of call cards, wherein each of the call cards is associated with one of the plurality of active auto-routed emergency calls. Each of the plurality of call cards displays at least one selected from the group consisting of an emergency caller identifier, an emergency caller location, an in-field first responder identifier, an in-field first responder location, an incident identifier, and an incident location. Each of the plurality of call cards includes at least one selected from the group consisting of a call join graphical control, a call redirect graphical control, a PTT graphical control, a view transcription graphical control, an incident associate graphical control, and an incident disassociate graphical control. The electronic processor is configured to control the display to present the graphical user interface.

For ease of description, some or all of the example devices and systems presented herein are illustrated with a single example of each of their component parts. Some examples may not describe or illustrate all components of the devices and systems. Other example embodiments may include more or fewer of each of the illustrated components, may combine some components, or may include additional or alternative components.

Figure 1:
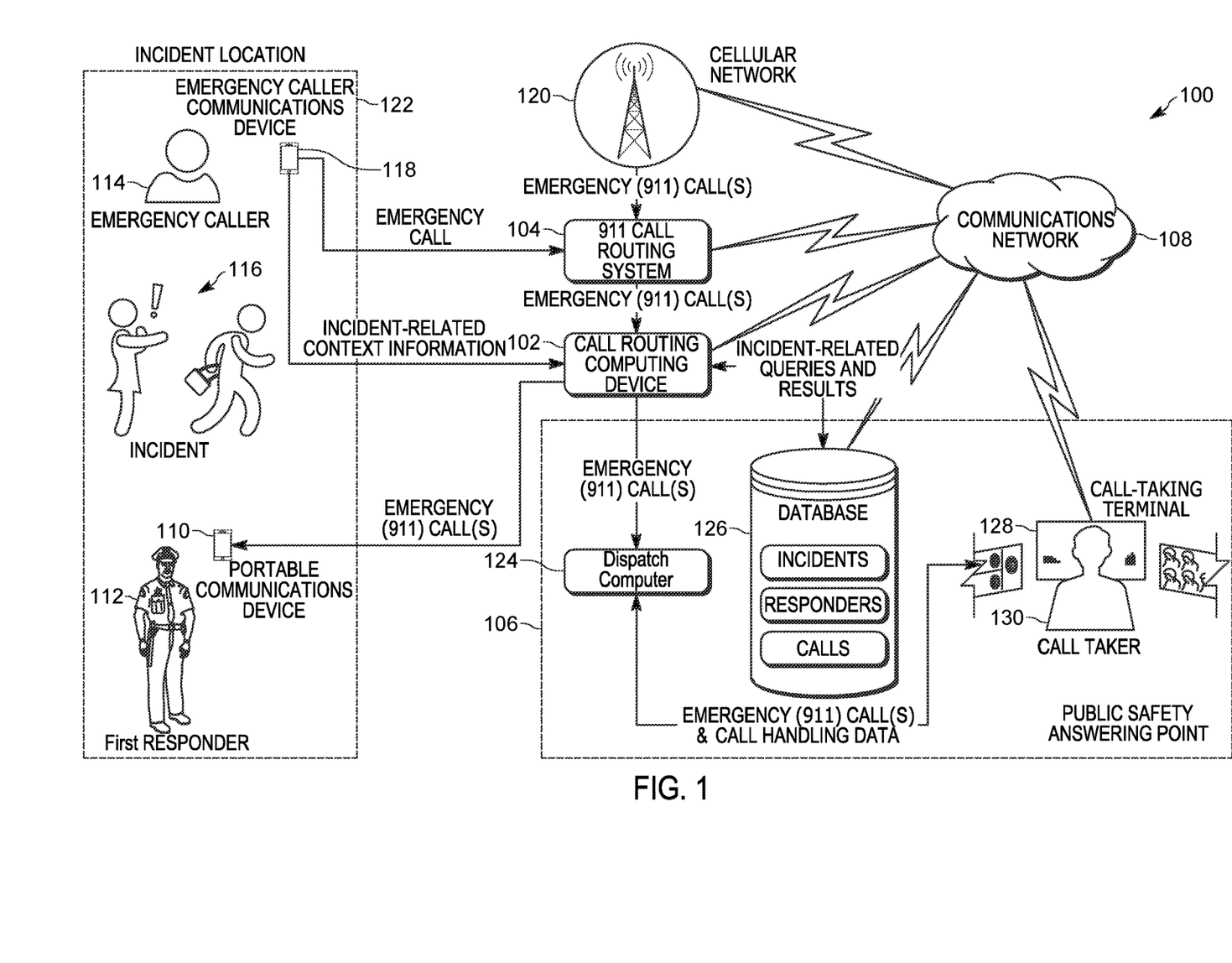
FIG. 1 illustrates a public safety communications system in accordance with some embodiments.

FIG. 1 illustrates an example public safety communications system 100. FIG. 1 shows one example of a networked configuration, in which embodiments may be implemented. Other configurations are possible. In the example shown, the system 100 includes a call routing computing device 102, a 911 call routing system 104, and a public safety answering point (PSAP) 106. It should be understood that the system 100 is provided as one example and, in some embodiments, the system 100 may include fewer or additional components. As would be understood by one skilled in the art, FIG. 1 is a simplified diagram. Networks are more complex than the schematic elements depicted in FIG. 1.

The call routing computing device 102, 911 call routing system 104, and PSAP 106 are communicatively coupled to one another via a communications network 108. The communications network 108 is a communications network including wireless connections, wired connections, or combinations of both. The communications network 108 may be implemented using a wide area network, for example, the Internet (including public and private IP networks), a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for Global Evolution (EDGE) network, a 3G network, a 4G network, 5G network and one or more local area networks, for example, a Bluetooth™ network or Wi-Fi network, and combinations or derivatives thereof.

Figure 2:
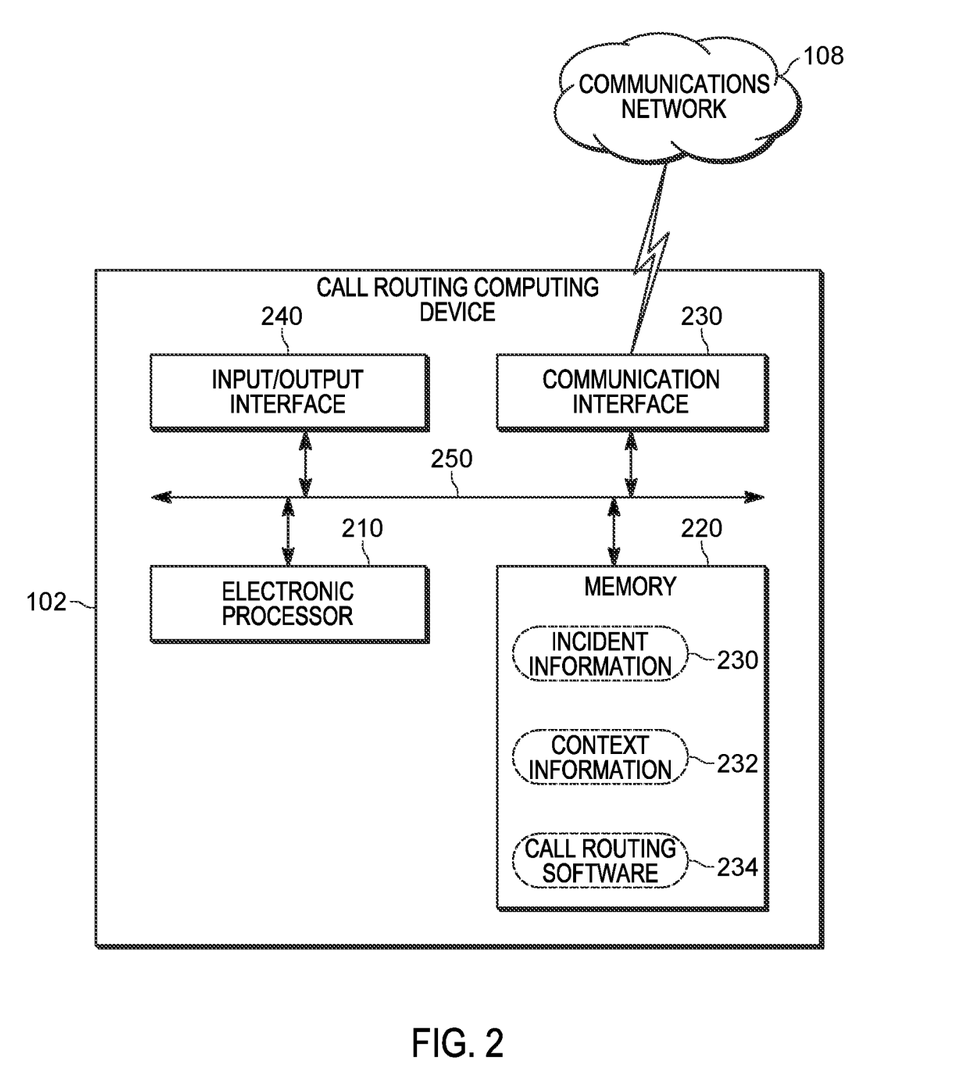
FIG. 2 schematically illustrates a call routing computing device of the system of FIG. 1 in accordance with some embodiments.

The call routing computing device 102, described more particularly with respect to FIG. 2, is communicatively coupled to the 911 call routing system 104 and the PSAP 106. As illustrated in FIG. 1, in some embodiments, the call routing computing device 102 is its own device or system, located apart from the 911 call routing system 104 and the PSAP 106. In alternative embodiments, the 911 call routing system 104 may be co-located with or integrated into the 911 call routing system or the PSAP 106.

As described in detail herein, the call routing computing device 102 is configured to receive emergency calls from the 911 call routing system 104, and selectively route the calls between the PSAP 106 and in field first responders (for example, to a portable communications device 110 of a first responder 112). For example, an emergency caller 114 (that is, a citizen or other non-first responder) encountering an incident 116 may place an emergency call (for example, by dialing 9-1-1) using an emergency caller communications device 118.

In some embodiments, the emergency caller communications device 118 is a portable communications device including hardware and software configured to communicate via the cellular network 120. The emergency caller communications device 118 may be, for example, a smart telephone, a mobile two-way radio, a smart watch, a laptop computer, a tablet computer, or another similar device capable of operating as described herein.

The cellular network 120 may operate according to an industry standard cellular protocol, for example, the Long Term Evolution (LTE) (including LTE-Advanced or LTE-Advanced Pro compliant with, for example, the 3GPP TS 36 specification series), or the 5G standard (including a network architecture compliant with, for example, the 3GPP TS 23 specification series and a new radio (NR) air interface compliant with the 3GPP TS 38 specification series), among other possibilities, and over which, among other things, an open mobile alliance (OMA) push to talk (PTT) over cellular (OMA-PoC), a voice over IP (VoIP), or a PTT over IP (PoIP) application may be implemented.

An emergency call placed via the cellular network is routed to the 911 call routing system 104. In FIG. 1, the 911 call routing system 104 represents the hardware and telecommunications infrastructure of a 911 system. The 911 call routing system 104 may include aspects of an Enhanced 911 (E911) system, a Next Generation 911 (NG911) system, or both. The 911 call routing system 104 operates to receive emergency calls placed by, among others, subscribers of the cellular network 120 and route those calls to a public safety answering point (for example, the PSAP 106). The 911 call routing system 104 chooses a PSAP for an emergency call based on the caller's current location (for example, as determined using a geolocation system contained in the emergency caller communications device 118). Embodiments described herein are not limited in their application to emergency calls placed via cellular networks and may apply to emergency calls placed using landlines (e.g., the public switched telephone network, IP phones, and the like) or through other means. In some embodiments, emergency calls may be placed automatically by, among other things, an IoT device.

An emergency call placed by the emergency caller communications device 118 and routed to the PSAP 106 through the 911 call routing system 104 is intercepted prior to connection with the PSAP 106 by the call routing computing device. As described in greater detail herein, the call routing computing device 102 receives incident-related context information and routes the emergency call based on the context information. For example, the location 122 of the incident 116, an identity of the emergency caller 114, an incident identifier, or other information may be used to match the emergency caller to the first responder 112. In such instances, the call routing computing device 102 routes the emergency call to the portable communications device 110 of the first responder 112, rather than connecting the emergency call to the PSAP 106.

The PSAP 106 includes a dispatch computer 124, a database 126, and a call-taking terminal 128. The dispatch computer 124, database 126, and call-taking terminal 128 are communicatively coupled using one or more wired and/or wireless networks (not shown). A call taker 130 interacts with the call-taking terminal 128 to answer communications, including emergency calls, received at the PSAP 106 and access and modify data stored in the database 126. The PSAP 106 performs computer aided dispatch (CAD) operations for law enforcement and other emergency services. Computer aided dispatch operations are known and will not be described in detail.

Communications received at the PSAP 106 include voice communications, for example, emergency calls received via the cellular network 120, the 911 call routing system 104, and the call routing computing device 102. In some embodiments, the PSAP 106 sends and receives other types of voice communications, including, for example, two-way radio communications, using other communications networks (not shown). Communications received at the PSAP 106 may also include data communications, including, for example, short message service (SMS) messages and multimedia message service (MMS) messages (collectively referred to herein as "text messages"), email messages, pages, instant messages, and the like.

The dispatch computer 124 includes, among other things, a processor (for example, a microprocessor or another suitable programmable device), a memory (i.e., a computer-readable storage medium), an input/output interface (not shown), and various other hardware and software components for performing computer aided dispatch, call control, and other operations at a PSAP.

The dispatch computer 124 is communicatively coupled to the call-taking terminal 128, which includes one or more input devices, output devices, or input and output devices including, for example, one or more displays, keyboards, keypads, mice, joysticks, touchscreens, speakers, microphones, and headsets. The dispatch computer 124 receives input from and provides output (including emergency calls) to the call taker 130 through the call-taking terminal 128. The dispatch computer 124 and the call-taking terminal 128 are capable of controlling call handling hardware and software (not shown) to originate and terminate voice calls (for example, emergency calls), text message communications, and other forms of electronic communication either alone, or by interfacing with network equipment (not shown) in the communications network 108 and other communications networks.

The dispatch computer 124 is communicatively coupled to, and writes data to and from, the database 126. As illustrated in FIG. 1, the database 126 may be a database housed on a suitable database server communicatively coupled to and accessible by the dispatch computer 124 and the call routing computing device 102. In alternative embodiments, the database 126 may be part of a cloud-based database system (for example, a data warehouse) external to the system 100 and accessible by components of the system 100 over one or more wired or wireless networks. In some embodiments, all or part of the database 126 may be locally stored on the dispatch computer 124.

For example, the dispatch computer 124 may use data stored in the database 126 and received from members of the public and first responders (for example, the emergency caller 114 and the first responder 112), and other sources to dispatch in-field first responders and other personnel to respond to incidents. In some embodiments the database 126 electronically stores incident data, responder data, and call data.

Incident data refers to incident records for public safety incidents. An incident record is a data structure within the database 126, which contains information regarding a public safety incident, stored in a particular sequence and format. In some embodiments, the database 126 stores the incident data in a computer aided dispatch (CAD) incident database. As used herein, the terms "incident" and "public safety incident" refer to situations requiring the attention of one or more public safety agencies to protect the public and keep the public safe. In one example, an incident is a crime in progress, such as a bank robbery. In other examples, an incident is the response to a call for service, for example, responding to a traffic accident, searching for a suspect, locating a missing person, responding to a fire, responding to a medical emergency, investigating a past incident, and the like. The incident data for a given incident includes an incident type (for example, a crime, a fire, a medical emergency, a natural disaster, a traffic stop, and the like), an incident identifier (for example, a unique alphanumeric code that identifies the incident record within a computer-aided dispatch system), call identifiers identifying emergency and non-emergency calls received related to the incident, and the like.

Examples of responder data include responder identifiers (for example, name, rank, agency, assignment, and the like), an active incident assignment for a responder, a responder role (for example, identifying a supervisory role or an area of operation overall or within the incident), a responder location, responder equipment data (for example, model, configuration, and responder assignment information for portable communications devices).

Call data includes data for calls, including emergency calls, routed to the PSAP 106 or to in-field first responders in lieu of the PSAP 106. Examples of call data include a call identifier (for example, a unique alphanumeric code that identifies the call record within a computer-aided dispatch system), an incident assignment associating the call with an incident, a location from which the call was placed, a caller identifier identifying the caller that placed the call, and the like.

The call taker 130 may be a dispatcher trained to handle incident communications. For example, within a next generation 911 system, the call taker 130 may be a public safety dispatcher trained to handle emergency communications. As noted above, these communications can include voice communications (for example, voice calls) and data communications (for example, text messages, email messages, pages, and the like). Based on the received communications, the call taker 130 may manually dispatch the appropriate services to handle incidents reported by individuals. Alternatively, or in addition, the dispatch computer 124 may be configured to automatically dispatch appropriate services. The dispatch computer 124 and the call-taking terminal 128 may also receive data input from the call taker 130, which is saved to the database 126. Generally, regardless of how or when an individual communicates with the PSAP 106 about an incident, information about the communication is stored in the database 126.

FIG. 2 schematically illustrates one embodiment of the call routing computing device 102. In the example illustrated, the call routing computing device 102 includes an electronic processor 210, a memory 220, a communication interface 230, and an input/output interface 240. The electronic processor 210, the memory 220, the communication interface 230, and the input/output interface 240 communicate over one or more control and/or data buses (for example, a communication bus 250). In some embodiments, the call routing computing device 102 is a computer server. FIG. 2 illustrates only one example embodiment of a call routing computing device 102. The call routing computing device 102 may include fewer or additional components and may perform functions other than those explicitly described herein.

In some embodiments, the electronic processor 210 is implemented as a microprocessor with separate memory, for example, the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), and application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out functionality of the call routing computing device 102 described herein. The memory 220 may include, for example, a program storage area and a data storage area. The program storage area and the data storage area may include combinations of different types of memory, for example, read-only memory and random-access memory. In the embodiment illustrated, the memory 220 stores, among other things, incident information 205 (for example, incident records retrieved from the database 126) and context information 232 (for example, as received from the emergency caller 114).

The communication interface 230 sends and receives communications to and from the call routing computing device 102 and other components of the system 100.

The input/output interface 240 may include one or more input mechanisms (for example, a touch screen, a keypad, buttons, knobs, and the like), one or more output mechanisms (for example, a display, a printer, a speaker, and the like), or a combination thereof. The input/output interface 240 receives input from input devices actuated by a user and provides output to output devices with which the user interacts. In some embodiments, as an alternative or in addition to managing inputs and outputs through the input/output interface 240, the call routing computing device 102 may receive user input, provide user output, or both by communicating with an external device, for example, a console computer (for example, the call-taking terminal 128), over a wired or wireless connection.

In some embodiments, the call routing computing device 102 uses one or more machine learning methods to analyze data to selectively route emergency calls (as described herein). Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using these approaches, a computer program can ingest, parse, and understand data and progressively refine algorithms for data analytics.

In some embodiments, one or more of the dispatch computer 124 and the call-taking terminal 128, although having distinct functions and capabilities, include systems or devices having a similar general component configuration as the call routing computing device 102, in that they each include a respective electronic processor, memory, communication interface, and input/output interface coupled by at least one communication bus.

Figure 3:
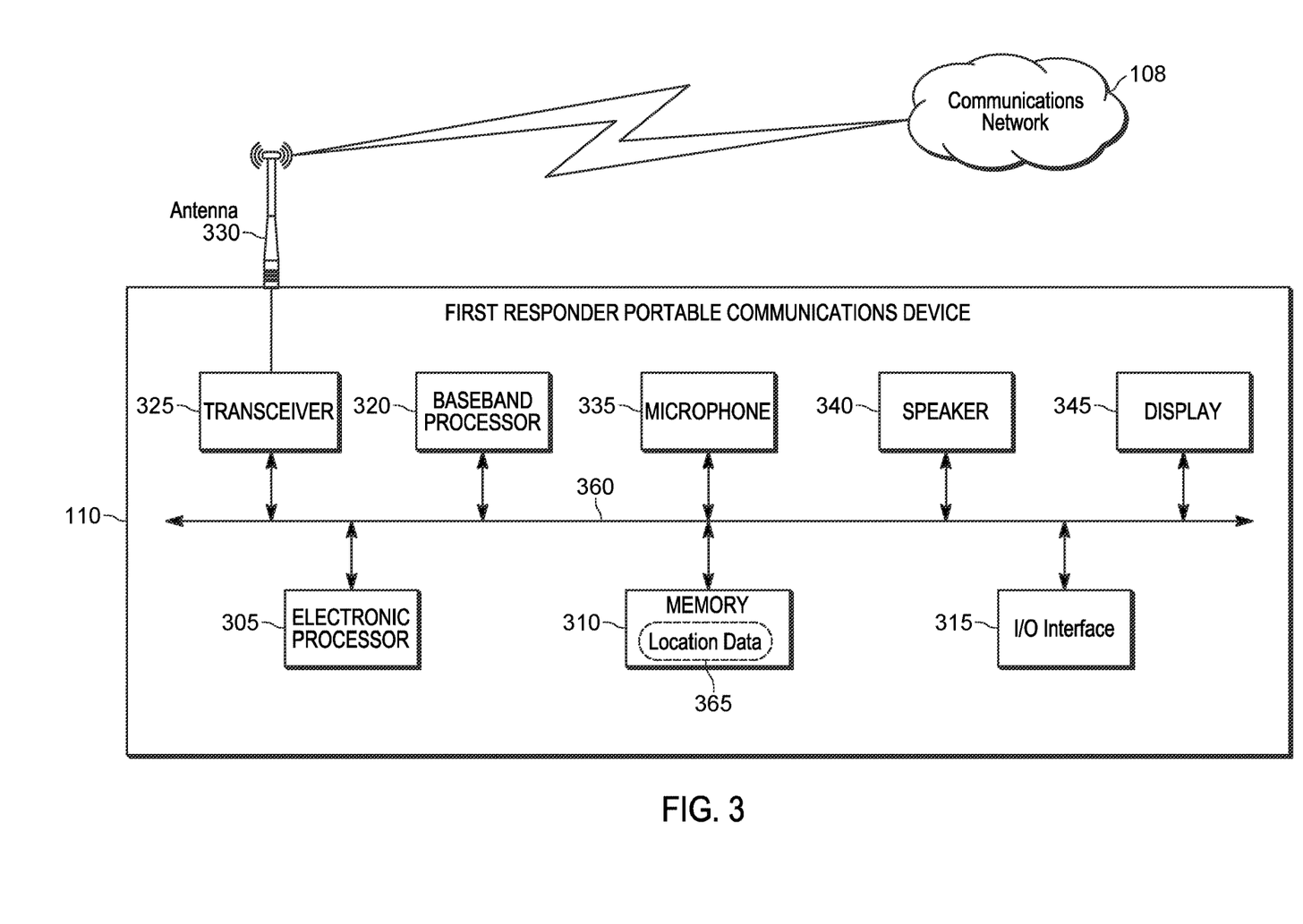
FIG. 3 schematically illustrates a first responder portable communications device of the system of FIG. 1 in accordance with some embodiments.

FIG. 3 illustrates an example of the portable communications device 110 in more detail. In some of the embodiments described herein, the portable communications device 110 is a smart telephone. However, in alternative embodiments, the portable communications device 110 may be a cellular telephone, a smart watch, a tablet computer, a personal digital assistant (PDA), a portable radio, a converged device (including both land-mobile radio and cellular components), or other device that includes or is capable of being coupled to a network modem or components to enable wireless network communications (such as an amplifier, antenna, etc.) on cellular, land mobile, or other wireless communications networks.

In the embodiment illustrated, the portable communications device 110 is a wireless communications device, which includes an electronic processor 305, a memory 310, an input/output interface 315, a baseband processor 320, a transceiver 325, an antenna 330, microphone 335, a loudspeaker 340, and a display 345. The illustrated components, along with other various modules and components are coupled to each other by or through one or more control and/or data buses that enable communication therebetween (for example, a communication bus 360). In some embodiments, the portable communications device 110 includes fewer or additional components in configurations different from that illustrated in FIG. 3.

The electronic processor 305 obtains and provides information (for example, from the memory 310 and/or the input/output interface 315), and processes the information by executing one or more software instructions or modules, capable of being stored, for example, in a random access memory ("RAM") area of the memory 310 or a read only memory ("ROM") of the memory 310 or another non-transitory computer readable medium (not shown). The software can include firmware, one or more applications, program data, filters, rules, one or more program modules, and other executable instructions. The electronic processor 305 is configured to retrieve from the memory 310 and execute, among other things, software related to the control processes and methods described herein (for example, the call routing software 234). For example, in the embodiment illustrated, the electronic processor 305 executes, among other things, location data 365.

The memory 310 can include one or more non-transitory computer-readable media and includes a program storage area and a data storage area. The program storage area and the data storage area can include combinations of different types of memory, as described herein. In the embodiment illustrated, the memory 310 stores, among other things, an activation code (described in detail herein).

The input/output interface 315 is configured to receive input and to provide system output. The input/output interface 315 obtains information and signals from, and provides information and signals to, (for example, over one or more wired and/or wireless connections) devices both internal and external to the portable communications device 110.

The electronic processor 305 is configured to control the baseband processor 320 and the transceiver 325 to transmit and receive radio frequency signals (for example, encoded with audio) to and from the portable communications device 110. The baseband processor 320 encodes and decodes digital data (including digitized audio signals) sent and received by the transceiver 325. The transceiver 325 transmits and receives radio signals to and from, for example, the communications network 108 (or another wireless network) using the antenna 330. The electronic processor 305, the baseband processor 320, and the transceiver 325 may include various digital and analog components (for example, digital signal processors, high band filters, low band filters, and the like), which for brevity are not described herein and which may be implemented in hardware, software, or a combination of both. In some embodiments, the transceiver 325 includes a combined transmitter-receiver component. In other embodiments, the transceiver 325 includes separate transmitter and receiver components.

The microphone 335 is a transducer capable of sensing sound, converting the sound to electrical signals, and transmitting the electrical signals to the electronic processor 305. The electronic processor 305 processes the electrical signals received from the microphone 335 to produce an audio signal, which may be transmitted to other devices via the transceiver 325. The loudspeaker 340 is a transducer for reproducing sound from electrical signals (for example, generated from a received audio signal) received from the electronic processor 305. The microphone 335 and the loudspeaker 340 support both audible and inaudible frequencies. In some embodiments, the microphone 335, the loudspeaker 340, or both may be integrated in a single housing with the other components (for example, in a portable hand-held radio). In some embodiments, the microphone 335, the loudspeaker 340, or both are present in an accessory device (for example, a remote speaker microphone (RSM)) connected via a wired or wireless connection to the portable communications device 110.

The display 345 is a suitable display, for example, a liquid crystal display (LCD) touch screen, or an organic light-emitting diode (OLED) touch screen. In some embodiments, the portable communications device 110 implements a graphical user interface (GUI) (for example, generated by the electronic processor 305, from instructions and data stored in the memory 310, and presented on the display 345), that enables a user to interact with the portable communications device 110.

In some embodiments, the emergency caller communications device 118, although having distinct functions and capabilities, includes hardware and software having a similar configuration as the portable communications device 110.

As noted, terminating and processing all emergency calls at a PSAP may lead to inaccuracies being introduced into reported information, delayed incident response, and overuse of network and computing resources. To mitigate these problems, the call routing computing device 102 selectively routes some emergency calls directly to in-field first responders, bypassing the PSAP 106. In one example embodiment, the call routing computing device 102 includes in the memory 220 call routing software 234, which, when executed, performs an example method 400 for selectively routing emergency calls (illustrated in FIG. 4). Although the method 400 is described in conjunction with the system 100 as described herein, the method 400 may be used with other systems and devices. In addition, the method 400 may be modified or performed differently than the specific example provided.

Figure 4:
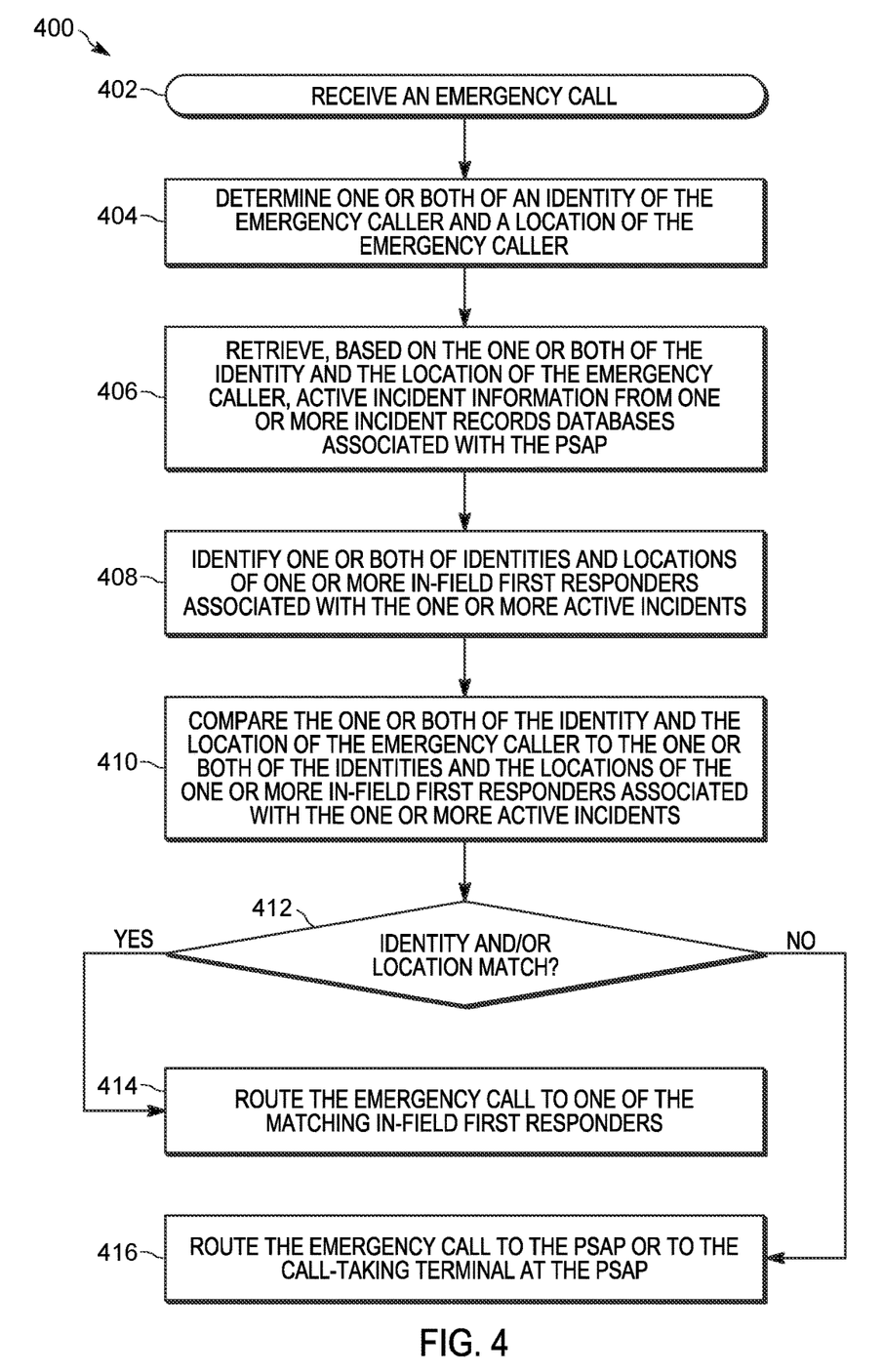
FIG. 4 is a flowchart illustrating a method for operating the call routing computing device of the system of FIG. 1 in accordance with some embodiments.

As an example, the method 400 is described as being performed by the call routing computing device 102 and, in particular, the electronic processor 210. In some embodiments, the electronic processor 210 includes multiple electronic processors included in the call routing computing device 102 that perform all or a portion of the method 400. Further, in some embodiments, the call routing computing device 102 is a distributed controller in which processors of multiple devices cooperate to form the call routing computing device 102 and perform its functionality. In some embodiments, portions of the method 400 may be performed by other devices, including for example, the portable communications device 110, the dispatch computer 124, and the call-taking terminal 128. It should be understood that, while the method 400 is described in terms of a single emergency caller communications device 118, a single call-taking terminal 128, and a single portable communications device 110, in some embodiments, the method 400 is applicable to combinations of one or more emergency caller communications devices, portable communications devices, dispatch computers and call-taking terminals.

At block 402, the electronic processor 210 receives an emergency call. For example, the communication interface 230 receives an emergency call from the 911 call routing system 104 with routing instructions or data indicating that the call is to be terminated at the PSAP 106. Prior to connecting the emergency call to the call-taking terminal 128 or more generally to the PSAP 106, the electronic processor 210 (at blocks 404-414) determines whether to connect the emergency call as intended by the 911 call routing system or route the emergency call to an in-field first responder.

At block 404, the electronic processor 210 determines one or both of an identity of the emergency caller and a location of the emergency caller. For example, the electronic processor 210 may receive a location for the emergency caller 114 from the cellular network 120. In some embodiments, the emergency caller communications device 118 may transmit context information, including a location for and identity of the emergency caller 114, to the call routing computing device 102. In some embodiments, the emergency caller communications device 118 may embed the context information as part of the emergency call (for example, using an NG911 or other suitable protocol). In some embodiments, the emergency caller communications device 118 may transmit the context information, directly or indirectly, to the call routing computing device 102 outside of the emergency call.

At block 406, the electronic processor 210 retrieves (for example, via the communication interface 230) active incident information from one or more incident records databases associated with the PSAP 106 (for example, stored in the database 126). For example, the electronic processor 210 may transmit a query to the database 126 requesting records that match the identity or the location of the emergency caller, or both. In some embodiments, the database 126 returns active incident information identifying one or more active incidents associated with the identity of the emergency caller, the location of the emergency caller, or both. For example, the database 126 may return information including an incident identifier for the incident 116 (see FIG. 1), the incident location 122, and identities and locations for in-field first responders associated with the incident (for example, the first responder 112).

At block 408, the electronic processor 210 identifies the identities, the locations, or both of one or more in-field first responders associated with the one or more active incidents. For example, the electronic processor 210 may extract from the data returned by the database 126 (at block 406) the name and location of the first responder 112, who is responding to the incident 116.

At block 410, the electronic processor 210 compares the one or both of the identity and the location of the emergency caller to the one or both of the identities and the locations of the one or more in-field first responders associated with the one or more active incidents to match, if possible, the emergency caller with an in-field first responder.

In some embodiments, the electronic processor 210 finds a match based on the comparison when the retrieved active incident information identifies a previous contact between the identity of the emergency caller and the identity of one of the one or more in-field first responders associated with the one or more active incidents. In some embodiments, a previous contact may include a stored indication of a prior voice or media call between the identity of the emergency caller and the identity of the one of the one or more in-field first responders in the retrieved active incident information (for example, in the incident record for the incident 116). For example, the incident record for incident 116 may indicate that the emergency caller 114 has telephoned or exchanged text messages with the first responder 112 before in relation to the incident 116. In another example, the incident record for incident 116 may indicate that the emergency caller 114 is mentioned in a report on the incident 116 drafted by the first responder 112.

In some embodiments, the electronic processor 210 finds a match based on the comparison when the location of the emergency caller is within a distance threshold of one or more of the locations of the one or more in-field first responders. In another example, emergency caller 114 and the first responder 112 may be within a threshold distance of one another, regardless of their distances from the incident.

In some embodiments, the electronic processor 210 finds a match based on the comparison when the location of the emergency caller and one or more of the locations of the one or more in-field first responders are within a same incident location as identified in the retrieved active incident information. For example, the location for the emergency caller 114 and the location for the first responder 112 may both be within the boundaries of a geofence around the location 122 for the incident 116.

In some embodiments, a match is based on a set of policies defined by the public safety agencies served by the PSAP. A policy is defined by the factors that go into determining a match, and a relative importance (for example, a weight) for each of the listed factors. Factors may include the locations of the incident, callers, and first responders; the age of a prior incident (for example, how much time has passed between a prior related incident and the current incident); first responder availability, and PSAP call volume.

Regardless of how a match is determined, at block 412, when a match is found based on the comparison, the electronic processor 210 (at block 414) routes (for example, via the communication interface 230), the emergency call to one of the matching in-field first responders, rather than routing the emergency call to the PSAP or to the call-taking terminal at the PSAP. For example, the call routing computing device 102 may include hardware and software for connecting the emergency call directly to the portable communications device 110 of the first responder 112.

In some embodiments, multiple matches may be determined. For example, both an identity-based match and a location-based match may be made, each to a different first responder. In such embodiments, the call routing computing device 102 will assign priorities to the matches, and route the call based on the priority of the match. For example, the call routing computing device 102 may route the emergency call to the highest priority match first and route to the next highest priority match if the highest priority match does not answer. In some embodiments, when a call routed based on the priority of the match goes unanswered, the call is re-routed to the PSAP or to the call-taking terminal at the PSAP.

In some embodiments, a default option sets priorities. For example, a match based on identity (e.g., a prior contact between the emergency caller and the in-field first responder) may be assigned the highest priority. In some embodiments, priority is assigned to matches based on preferences in policies provided by public safety agencies.

In some embodiments, when multiple matches of the same type are determined, the call routing computing device 102 assigns priorities to the matches based on the type of match. For example, where multiple identity-based matches are determined, factors such as the most recent correspondence may be used to rank the matches. In some embodiments, incident metadata may be used. For example, when an incident has multiple in-field first responders available, a preferred responder may be identified for the incident (e.g., an incident commander or other supervisor). In another example, where multiple location-based matches are determined, the matches may be ranked by distance (e.g., between the emergency caller and the in-field first responder). In some embodiments, the location-based matches may be ranked based on which in-field first responder can most quickly arrive at the location of the incident or the emergency caller.

In some embodiments, multiple matches are displayed on the call-taking terminal 128, which allows the call taker 130 to override the routing a choose the in-field first responder or take the call directly. For example, the call taker 130 may override the chosen match by specifying an alternative or by indicating that the selection is not viable, in which case the call routing computing device 102 automatically chooses another in-field first responder (for example, the match with the next highest priority compared to the match marked as not viable by the call taker 130).

In some embodiments, the call routing computing device 102 informs the emergency caller (for example, using a voice prompt) that the call is being routed to an in-field first responder familiar with the incident (for example, when a match is determined based on a prior contact). In some embodiments, the matching incident is identified to the emergency caller by listing an incident number. In some embodiments, the emergency caller is able confirm that they are calling about that incident (for example, using interactive voice response (IVR)). A confirmation (for example, speaking "yes" or pressing a specified touch tone digit) or no response from the emergency caller would be interpreted as acceptance, and the call would be routed to the matched in-field first responder as described herein. In some embodiments, where the match is determined based on location, the emergency caller may not be provided an opportunity to confirm or opt out of the automated call routing.

Figure 5:
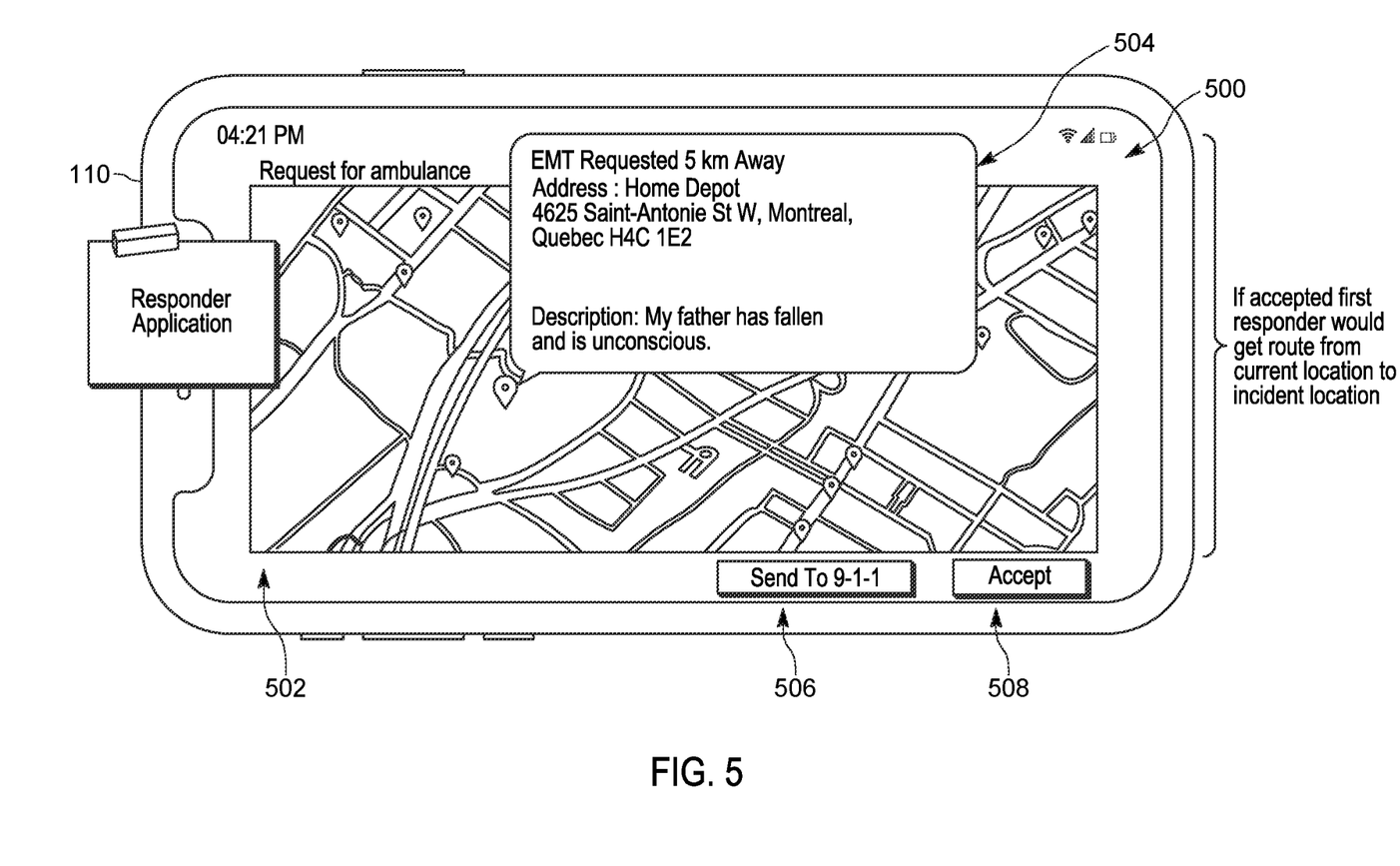
FIG. 5 illustrates an example graphical user interface generated by the first responder portable communications device of FIG. 3 in accordance with some embodiments.

In some embodiments, the call routing computing device 102 transmits (for example, via the communication interface 230), a call setup request message to a portable communications device associated with the one of the matching in-field first responders (for example, the portable communications device 110). In some embodiments, as illustrated in FIG. 5, the call setup request is presented to a user of the portable communications device 110 via a graphical user interface 500. As illustrated in FIG. 5, the graphical user interface 500 includes a map 502, upon which is overlaid incident information. In the example embodiments illustrated, the call setup request message is presented in a popup window 504, and the first responder has the option of denying the call using the deny button 506 or accepting the call using the accept button 508. In some embodiments, when the first responder chooses the accept button 508, the graphical user interface presents route information from the first responder's present location to the location of the incident or the emergency caller.

Returning to FIG. 4, when the electronic processor 210 receives, (for example via the communication interface 230), a call accept message from the portable communications device 110, it connects the emergency call between the emergency caller communications device 118 and the portable communications device 110.

When the electronic processor 210 receives, (for example via the communication interface 230) in response to the call setup request message, a call denial message from the portable communications device 110, the call routing computing device 102 connects the emergency call between the emergency caller communications device 118 and the PSAP 106. Alternatively, in some embodiments, the call routing computing device 102 connects the emergency call between the emergency caller communications device 118 and the portable communications device of another available in field first responder who is available to receive emergency calls (for example, based on priorities assigned to the matches as described herein).

In some embodiments, the electronic processor 210 actively monitors or periodically determines the current call load at the PSAP 106. When the call load at the PSAP 106 is below a threshold call load, and the PSAP 106 has sufficient capacity to handle the emergency call, and it may not be routed to in-field first responders. In some embodiments, when a match is found, the call routing computing device 102 only routes the emergency call to one of the matching in-field first responders when the call load at the PSAP 106 exceeds a threshold call load. In some embodiments, the call load threshold is adjusted during certain hours. For example, there may be time periods during which the in-field first responders are busier with patrol duties and ad hoc incident response (for example, during the evening hours on the weekends) and are therefore less able to take calls. Such time periods may be identified by the dispatch computer 124, using historical data from the database 126. During these time periods, the threshold call load may be increased to reduce automated routing of emergency calls to in-field first responders.

In some embodiments, when a match is found, the call routing computing device 102 only routes emergency calls to in-field first responders when one of the matching in-field first responders is identified in a stored database (for example, the database 126) at the PSAP 106 as being available for receiving emergency calls. For example, some in-field first responders may be actively engaged in responding to other aspects of the incident and be marked in the database 126 as unavailable for calls.

In some embodiments, the call routing computing device receives additional incident-related context information from the emergency caller. For example, the context information may include relationship information indicating a relationship to one or more persons already identified in the active incident information. For example, the emergency caller may be related to a victim of or witness to the incident. In another example, the emergency caller may reside at the same address or work for the same employer as other callers or persons involved in the incident.

In another example, the context information may include additional descriptive information regarding one or more persons already identified in the active incident information. For example, the emergency caller may indicate in their call, or via another means, that they have more information about a victim of or witness to the incident.

In another example, the context information may include sensor information regarding one or more persons already identified in the active incident information. For example, the emergency caller may have video of the incident including images of a victim of or witness to the incident.

In such embodiments, when a match is found between the identity of the emergency caller and one or more identities of the one or more in-field first responders, the electronic processor 210 determines to which one of the matching in-field first responders the emergency call is routed based on the additional incident-related context information. For example, three in-field first responders may be matched to the emergency caller based on their locations. However, the call may be routed to one of three because that in-field first responder has interviewed a witness for which the caller has additional information.

In some embodiments, when a match is found (at block 412), the call routing computing device 102 only routes emergency calls to in-field first responders when the match exceeds a quality threshold. In such embodiments, the call routing computing device 102 assigns a quality level to each match. In some embodiments, the quality level is a numerical value (for example, a percentage or a number assigned from a defined range) that indicates a level of certainty or confidence in the match. In such embodiments, the quality threshold is a numerical value that indicates a preferred level of certainty that must be reached before an emergency call with be automatically routed. For example, an exact match between an emergency caller phone number and a prior contact with an in-field first responder that occurred within the timeframe of the incident may result in a high (for example, 80% on a 100% scale) quality level. In another embodiment, an emergency caller who presents with only a last name that matches a last name from a prior contact that is older than 24 hours may result in a mid-range (for example, 50% on a 100% scale) quality level. In some embodiments, the call routing computing device 102 routes emergency calls to in-field first responders based on a quality threshold and another factor. For example, an emergency call may be routed to an in-field first responder only when the quality level exceeds a minimum threshold and the distance of the in-field first responder is within a determined range (for example, a five-minute response time).

In some embodiments, when a match is found (at block 412) and the call is routed to an in-field first responder (at block 414), the call routing computing device 102 provides (for example, via a separate link to the PSAP 106 from the call routing computing device 102), voice and data for the emergency call to an operator console device (for example, the call-taking terminal 128) at the PSAP 106. In this way, even though the call is being handled by the in-field first responder, the audio and certain data for the call may still be monitored, interacted with, and stored by the PSAP 106. For example, the dispatch computer 124 or call-taking terminal 128 may produce a text transcription from the call audio. In some embodiments, the call routing computing device 102 provides, with data for the emergency call, the identity of the emergency caller and the identity of the one of the matching in-field first responders to the operator console device. In some embodiments, the call routing computing device 102 stores the voice and data for the emergency call in the database 126.

Finally, at block 412, when a match is not found based on the comparison, the electronic processor 210 (at block 416) routes (for example, via the communication interface 230), the emergency call to the PSAP 106 or to the call-taking terminal 128 at the PSAP 106, rather to any of the one or more in-field first responders.

Figure 6:
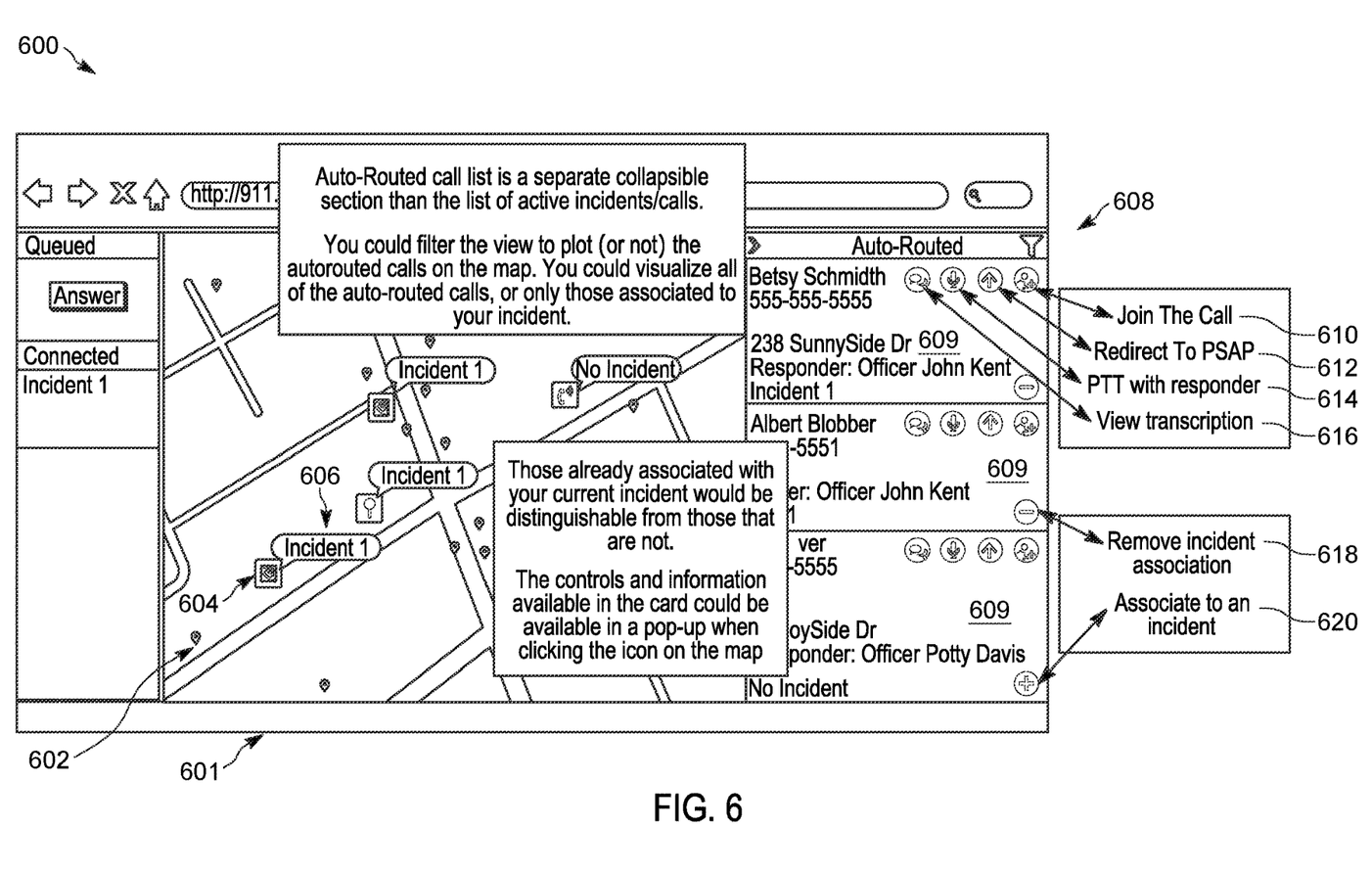
FIG. 6 illustrates an example graphical user interface generated for a call-taking terminal when the method of FIG. 4 is performed by the system of FIG. 1 in accordance with some embodiments.

As noted, in some embodiments, when the call is routed to an in-field first responder (at block 414), the call routing computing device 102 provides voice and data for the emergency call to an operator console device (for example, the call-taking terminal 128) at the PSAP 106. FIG. 6 illustrates an example graphical user interface 600 generated for a call-taking terminal 128, which allows the call taker 130 to monitor and interact with emergency calls that have been routed to in-field first responders. As illustrated in FIG. 6, the graphical user interface 600 includes a primary window 601 including a map 602, and a plurality of auto-routed emergency caller indicators (for example, indicators 604, 606) overlaid on the map 602. Each of the plurality of auto-routed emergency caller indicators is associated with one of a plurality of active auto-routed emergency calls.

The graphical user interface 600 also includes a secondary window 608 including a collapsible list of call cards 609.

Each of the call cards 609 is associated with one of the plurality of active auto-routed emergency calls.

As illustrated, each of the plurality of call cards 609 displays at least one of an emergency caller identifier, an emergency caller location, an in-field first responder identifier, an in-field first responder location, an incident identifier, and an incident location.

Each of the plurality of call cards includes a number of graphical control elements. For example, the call join graphical control 610, which enables the call taker 130 to join the emergency call already in progress between the emergency caller and the in-field first responder. Another example is the call redirect graphical control 612, which redirects the call from the in-field first responder back to the PSAP 106. Another example is the PTT graphical control 614, which establishes a push-to-talk communication between the call-taking terminal 128 and a push-to-talk capable device associated with the in-field first responder. Another example is the view transcription graphical control 616, which, when selected, displays (for example, in a popup window) a text transcript of the emergency call in progress. Another example is the incident associate graphical control 620. When an emergency call has not yet been associated with an active incident, selecting this control allows the call taker 130 to choose an active incident, to which the call will be associated, or to create a new incident for the call. Another example is the incident disassociate graphical control 618. When an emergency call has been associated with an active incident, selecting this control allows the call taker 130 to remove the association with the active incident. In some embodiments, selecting this control also prompts the call taker 130 to select another incident with which to associate the call.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms for example, first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

It should also be understood that although certain examples depict components as logically separate, such depiction is merely for illustrative purposes. In some embodiments, the illustrated components may be combined or divided into separate software, firmware and/or hardware. Regardless of how they are combined or divided, these components may be executed on the same computing device or may be distributed among different computing devices connected by one or more networks or other suitable communication means.

In addition, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method for routing an emergency call between a public safety answering point (PSAP) and in-field first responders, the method comprising:
   determining, at a call routing computing device, one or both of an identity of an emergency caller and a location of the emergency caller;
   retrieving, by the call routing computing device, based on the one or both of the identity and the location of the emergency caller, active incident information from one or more incident records databases associated with the PSAP, the active incident information identifying one or more active incidents associated with the one or both of the identity and the location of the emergency caller;
   identifying, by the call routing computing device, one or both of identities and locations of one or more in-field first responders associated with the one or more active incidents;
   comparing the one or both of the identity and the location of the emergency caller to the one or both of the identities and the locations of the one or more in-field first responders associated with the one or more active incidents, and:
      when a match is found based on the comparison, routing, by the call routing computing device, the emergency call to one of the matching in-field first responders and not to the PSAP or to a call-taking terminal at the PSAP; and
      when a match is not found based on the comparison, routing, by the call routing computing device, the emergency call to the PSAP or to the call-taking terminal at the PSAP and not to any of the one or more in-field first responders.

2. The method of claim 1, wherein a match is found when the retrieved active incident information identifies a previous contact between the identity of the emergency caller and the identity of one of the one or more in-field first responders associated with the one or more active incidents.

3. The method of claim 2, wherein a previous contact includes a stored indication of a prior voice or media call between the identity of the emergency caller and the identity of the one of the one or more in-field first responders in the retrieved active incident information.

4. The method of claim 1, further comprising:
   determining a current call load at the PSAP; and
   when a match is found, routing, by the call routing computing device, the emergency call to one of the matching in-field first responders and not to the PSAP only when the call load at the PSAP exceeds a threshold call load.

5. The method of claim 1, wherein, when a match is found, routing, by the call routing computing device, the emergency call to one of the matching in-field first responders and not to the PSAP only when one of the matching in-field first responders is identified in a stored database at the PSAP as available for receiving emergency calls.

6. The method of claim 1, further comprising:
   electronically receiving additional incident-related context information from the emergency caller, the context information including at least one selected from the group consisting of relationship information indicating a relationship to one or more persons already identified in the active incident information, additional descriptive information regarding one or more persons already identified in the active incident information, and sensor information regarding one or more persons already identified in the active incident information, and
   when a match is found between the identity of the emergency caller and one or more identities of the one or more in-field first responders, determining to which one of the matching in-field first responders the emergency call is routed based on the additional incident-related context information.

7. The method of claim 1, wherein a match is found when the location of the emergency caller is within a distance threshold of one or more of the locations of the one or more in-field first responders.

8. The method of claim 1, wherein a match is found when the location of the emergency caller and one or more of the locations of the one or more in-field first responders are within a same incident location as identified in the retrieved active incident information.

9. The method of claim 1, further comprising:
   when a match is found based on the comparison, providing, via a separate link to the PSAP from the call routing computing device, voice and data for the emergency call to an operator console device at the PSAP.

10. The method of claim 9, further comprising:
    providing, with the data for the emergency call, the identity of the emergency caller and the identity of the one of the matching in-field first responders to the operator console device.

11. The method of claim 10, further comprising:
    storing the data for the emergency call, the identity of the emergency caller, and the identity of the one of the matching in-field first responders in the active incident information.

12. A call routing computing device communicatively coupled between an emergency caller communications device initiating an emergency call and a call-taking terminal at a public safety answering point (PSAP), the call routing computing device comprising:
    a communication interface; and
    an electronic processor communicatively coupled to the communication interface, and configured to
    receive, via the communication interface, the emergency call and, prior to connecting the emergency call to the call-taking terminal at the PSAP:
       determine one or both of an identity of an emergency caller associated with the emergency caller communications device and a location of the emergency caller;
       retrieve, via the communication interface and based on the one or both of the identity and the location of the emergency caller, active incident information from one or more incident records databases associated with the PSAP, the active incident information identifying one or more active incidents associated with the one or both of the identity and the location of the emergency caller;
       identify one or both of identities and locations of one or more in-field first responders associated with the one or more active incidents;
       compare the one or both of the identity and the location of the emergency caller to the one or both of the identities and the locations of the one or more in-field first responders associated with the one or more active incidents, and:

when a match is found based on the comparison, route, via the communication interface, the emergency call to one of the matching in-field first responders and not to the PSAP or to the call-taking terminal at the PSAP; and when a match is not found based on the comparison, route, via the communication interface, the emergency call to the PSAP or to the call-taking terminal at the PSAP and not to any of the one or more in-field first responders.

13. The call routing computing device of claim 12, wherein the electronic processor is configured to find a match based on the comparison when the retrieved active incident information identifies a previous contact between the identity of the emergency caller and the identity of one of the one or more in-field first responders associated with the one or more active incidents.

14. The call routing computing device of claim 13, wherein a previous contact includes a stored indication of a prior voice or media call between the identity of the emergency caller and the identity of the one of the one or more in-field first responders in the retrieved active incident information.

15. The call routing computing device of claim 12, wherein the electronic processor is further configured to:
determine a current call load at the PSAP; and
when a match is found, route, via the communication interface, the emergency call to one of the matching in-field first responders and not to the PSAP only when the call load at the PSAP exceeds a threshold call load.

16. The call routing computing device of claim 12, wherein the electronic processor is further configured to, when a match is found, route, via the communication interface, the emergency call to one of the matching in-field first responders and not to the PSAP only when one of the matching in-field first responders is identified in a stored database at the PSAP as available for receiving emergency calls.

17. The call routing computing device of claim 12, wherein the electronic processor is further configured to:
receive additional incident-related context information from the emergency caller, the context information including at least one selected from the group consisting of relationship information indicating a relationship to one or more persons already identified in the active incident information, additional descriptive information regarding one or more persons already identified in the active incident information, and sensor information regarding one or more persons already identified in the active incident information, and
when a match is found between the identity of the emergency caller and one or more identities of the one or more in-field first responders, determine to which one of the matching in-field first responders the emergency call is routed based on the additional incident-related context information.

18. The call routing computing device of claim 12, wherein the electronic processor is configured to find a match based on the comparison when the location of the emergency caller is within a distance threshold of one or more of the locations of the one or more in-field first responders.

19. The call routing computing device of claim 12, wherein the electronic processor is configured to find a match based on the comparison when the location of the emergency caller and one or more of the locations of the one or more in-field first responders are within a same incident location as identified in the retrieved active incident information.

20. The call routing computing device of claim 12, wherein the electronic processor is further configured to, when a match is found based on the comparison, provide, via a separate link to the PSAP from the call routing computing device, voice and data for the emergency call to an operator console device at the PSAP.

21. The call routing computing device of claim 20, wherein the electronic processor is further configured to provide, with the data for the emergency call, the identity of the emergency caller and the identity of the one of the matching in-field first responders to the operator console device.

22. The call routing computing device of claim 20, wherein the electronic processor is further configured to store the data for the emergency call, the identity of the emergency caller, and the identity of the one of the matching in-field first responders in the active incident information.

23. The call routing computing device of claim 12, wherein the electronic processor is configured to, when a match is found based on the comparison:
transmit, via the communication interface, a call setup request message to a portable communications device associated with the one of the matching in-field first responders;
receive, via the communication interface, a call accept message from the portable communications device; and
connect the emergency call between the emergency caller communications device and the portable communications device.

24. The call routing computing device of claim 23, wherein the electronic processor is further configured to:
receive, via the communication interface and in response to the call setup request message, a call denial message from the portable communications device; and
in response to the call denial message, connect the emergency call between the emergency caller communications device and the PSAP.

25. A system for routing an emergency call between a public safety answering point (PSAP) and in-field first responders, the system comprising:
a display;
a transceiver; and
an electronic processor communicatively coupled to the display and the transceiver, and configured to:
receive, with the transceiver and from a plurality of emergency caller communications devices, a plurality of active auto-routed emergency calls connected by a call routing computing device communicatively coupled between the plurality of emergency caller communications devices and a call-taking terminal at a public safety answering point (PSAP), wherein the call routing computing device bypassed the PSAP to connect the plurality of active auto-routed emergency calls to the transceiver;
generate a graphical user interface including:
a primary window including a map, and a plurality of auto-routed emergency caller indicators overlaid on the map, wherein each of the plurality of auto-routed emergency caller indicators is associated with one of the plurality of active auto-routed emergency calls, and a secondary window including a collapsible list of call cards, wherein each of the call cards is associated with one of the plurality of active auto-routed emergency calls, wherein each of the plurality of call cards displays at least one selected from the group consisting of an emergency caller identifier, an emergency caller location, an in-field first responder identifier, an in-field first responder location, an incident identifier, and an incident location;

wherein each of the plurality of call cards includes at least one selected from the group consisting of a call join graphical control, a call redirect graphical control, a PTT graphical control, a view transcription graphical control, an incident associate graphical control, and an incident disassociate graphical control; and control the display to present the graphical user interface.

* * * * *